(12) United States Patent
Rosen et al.

(10) Patent No.: US 12,519,416 B2
(45) Date of Patent: Jan. 6, 2026

(54) CONTROL DEVICE AND CONTROL METHOD FOR AN ELECTRIC DRIVE SYSTEM, AND ELECTRIC DRIVE SYSTEM

(71) Applicant: Robert Bosch GmbH, Stuttgart (DE)

(72) Inventors: Alexander Rosen, Osnabrueck (DE); Helge Sprenger, Kornwestheim (DE); Michael Bangerter, Markgroeningen (DE); Thomas Zeltwanger, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 17/924,796

(22) PCT Filed: Apr. 30, 2021

(86) PCT No.: PCT/EP2021/061406
§ 371 (c)(1),
(2) Date: Jun. 19, 2023

(87) PCT Pub. No.: WO2021/228583
PCT Pub. Date: Nov. 18, 2021

(65) Prior Publication Data
US 2023/0327599 A1    Oct. 12, 2023

(30) Foreign Application Priority Data
May 12, 2020  (DE) ............ 10 2020 205 919.5

(51) Int. Cl.
*H02P 29/60* (2016.01)
*B60L 15/20* (2006.01)

(52) U.S. Cl.
CPC ............ *H02P 29/60* (2016.02); *B60L 15/20* (2013.01)

(58) Field of Classification Search
CPC ................................. H02P 29/60; B60L 15/20
USPC ......................................................... 318/473
See application file for complete search history.

(56) References Cited

U.S. PATENT DOCUMENTS

2014/0028238 A1*  1/2014  Tsukamoto  ............ H02P 1/022
                                                                          318/504

FOREIGN PATENT DOCUMENTS

| CN | 102177650 A | 9/2011 |
|----|-------------|--------|
| CN | 102959855 A | 3/2013 |
| DE | 102015201301 A1 | 7/2016 |
| DE | 102015224726 A1 | 6/2017 |
| DE | 102017202395 A1 | 8/2017 |
| DE | 102017117720 A1 | 4/2018 |
| DE | 102017203668 A1 | 9/2018 |
| EP | 3185408 A1 | 6/2017 |
| WO | 2019123911 A1 | 6/2019 |

OTHER PUBLICATIONS

Ying (CN 207321155 U) Man-Machine Interactive Body Hub Motor of Vehicle Control System (Year: 2018).*

(Continued)

*Primary Examiner* — Jorge L Carrasquillo
(74) *Attorney, Agent, or Firm* — Michael Best & Friedrich LLP

(57) ABSTRACT

The present invention relates to controlling an electric drive system. According to the invention, the rotor temperature of an electrical machine is monitored and modulation methods and the switching frequency for controlling the drive system are adapted depending on the rotor temperature.

9 Claims, 3 Drawing Sheets

(56) References Cited

OTHER PUBLICATIONS

Tubouchi et al. (WO 2011099258 A1)Brushless Motor Drive Device, Brushless Motor, and Air Conditioner (Year: 2011).*
Tasaki et al. (JP 2009171640 A)Drive Control Device and Drive Control Method of Electric Motor, and Electric Vehicle (Year: 2009).*
(JP 3507753 B2) Inverter System For Driving Electric Vehicles (Year: 2004).*
Translation of International Search Report for Application No. PCT/EP2021/061406 dated Jul. 12, 2021 (2 pages).

* cited by examiner

CONTROL DEVICE AND CONTROL METHOD FOR AN ELECTRIC DRIVE SYSTEM, AND ELECTRIC DRIVE SYSTEM

BACKGROUND OF THE INVENTION

The present invention relates to a device and a method for controlling an electric drive system. The present invention furthermore relates to an electric drive system.

Electric drive systems are used, for example, in fully or at least partially electrically driven vehicles. In this case, electrical energy is provided by a so-called traction battery and converted by means of an electric power converter into an alternating voltage which is suitable for operating the electrical machine according to the desired setpoint specifications.

Publication DE 10 2017 203 668 A1 describes a method and a device for operating an inverter for a drive system. The method presented here comprises a step for determining a switching frequency for the inverter using a working point signal. The method furthermore comprises a step for providing a frequency signal in order to set a specified switching frequency at the inverter.

SUMMARY OF THE INVENTION

The present invention provides a device and a method for controlling a voltage converter as well as an electric drive system having the features of the independent claims. Further advantageous embodiments are the subject matter of the dependent claims.

Accordingly, the following is provided:

A control device for an electric drive system, in particular an electric drive system comprising a power converter and an electrical machine. The control device comprises a monitoring unit and a control unit. The monitoring unit is designed to determine a temperature in a rotor of the electrical machine. The control unit is designed to generate control signals for controlling the voltage converter. In particular, the control unit is designed to generate the control signals according to a predetermined modulation method and to provide them to the voltage converter. The control unit is furthermore designed to adapt the modulation method using the determined temperature in the rotor.

The following is furthermore provided:

An electric drive system comprising an electrical machine, a power converter designed to control the electrical machine, and a control device according to the invention.

Finally, the following is provided:

A method for controlling an electric drive system comprising a power converter and an electrical machine. The method comprises a step for operating the voltage converter with a predetermined modulation method. Furthermore, the method comprises a step for determining a temperature in the rotor of the electrical machine. In addition, the method comprises a step for adapting the modulation method using the determined temperature in the rotor of the electrical machine.

The present invention is based on the finding that the selection of the modulation method as well as the clock rate or switching frequency for controlling the switching elements in a voltage converter influence the temperature development in an electrical machine. In order to avoid critical operating states, in particular in order to avoid an impermissible temperature increase in the rotor of an electrical machine, high tolerances in the control of the voltage converter of an electric drive system are therefore planned. For example, the control of the voltage converter may be designed in such a way that specific modulation methods are not used in continuous operation in order to avoid overloading, even though they would be preferable with respect to efficiency or other properties, for example.

However, since the critical rotor temperatures generally only occur very rarely and under unfavorable conditions in operation, it is an idea of the present invention to dynamically adapt the selection of the control method as well as the parameterization of the selected control method depending on the rotor temperature in an electrical machine. In this way, on the one hand, the electric drive system can be protected from a dangerous temperature increase, in particular a temperature increase in the rotor of the electrical machine, in the case of critical loads. On the other hand, it is possible to dispense with disproportionately high safety margins outside of these special critical operating conditions and to thus control the electric drive system in a more advantageous and in particular more efficient operating mode. The electric drive system may thus be protected from overloads due to too high temperatures. In addition, efficient operation of the electric drive system is possible. By operating the electric drive system at a higher efficiency, the overall losses are thus also reduced, which thus also leads to a lower temperature development of the overall system. In this way, further assemblies of the electric drive system may, if necessary, also be loaded less.

As explained in more detail below, the rotor temperature of the electrical machine may be determined in any manner. For example, it is possible to directly or indirectly measure the rotor temperature by means of suitable temperature sensors and to provide corresponding sensor signals. Additionally or alternatively, it is also possible to model the temperature development in the rotor of the electrical machine and to calculate it based on a mathematical model. For this purpose, sensor signals which can indirectly provide a conclusion about the temperature development in the rotor of the electrical machine may, for example, be used. For example, electric voltages and/or currents within the drive system may be detected for this purpose. In addition, setpoint specifications or the like may also be included in the calculation of the temperature development in the rotor of the electrical machine.

The electric drive system comprises a voltage converter which converts an input voltage, e.g., an electric direct voltage from an energy store, such as the traction battery of an electric vehicle, into an electric voltage suitable for controlling the electrical machine. For this purpose, one or more half bridges with two semiconductor switching elements each may be provided in the voltage converter, for example. The semiconductor switching elements may, for example, be bipolar transistors comprising an isolated gate connection, MOSFET switching elements, or switching elements based on silicon carbide (SiC). The switching elements may, for example, be opened or closed at a specified switching frequency or clock rate. The electric voltage at the output of the voltage converter can be set by varying the duty cycle between switch-on duration and period duration when controlling the switching elements. The selection of the switching frequency can be influenced by a plurality of factors. For example, a high switching frequency results in high switching losses within the voltage converter. On the other hand, a high switching frequency generally results in lower losses in the electrical machine due to lower harmonics. In addition, the selection of the switching frequency also influences the noise development of the electric drive system. In addition to these factors, the selection of the switching frequency also influences the rotor temperature due to the losses of the electrical machine.

In addition to the variation of the switching frequency, it is additionally also possible to choose between different modulation methods for controlling the switching elements in the voltage converter. One such modulation method is, for example, the so-called Space Vector Pulse Width Modulation (SVPWM). In addition, special modulation methods, such as the so-called flat-top method or a so-called fundamental frequency clocking, may also be used to reduce the switching operations, for example. Furthermore, it is also possible, for example, to optimize the efficiency of the electric drive system by so-called overmodulation.

By a suitable selection of the modulation method as well as the switching frequency used, the operation of the electric drive system can thus be optimized. In particular, by considering the rotor temperature when selecting the modulation method and the switching frequency used, the electric drive system can be operated at a high efficiency and a high effectiveness without having to accept overloading due to too high a rotor temperature.

According to one embodiment, the monitoring unit is designed to calculate the temperature in the rotor of the electrical machine. Additionally or alternatively, the monitoring unit may also be designed to determine the temperature in the rotor of the electrical machine using measured values. As already stated above, the calculation of the rotor temperature may be calculated by means of a suitable simulation and on the basis of a mathematical model. In this way, an estimation of the rotor temperature is possible. Furthermore, the rotor temperature may be determined directly or indirectly based on sensor values. For example, temperature sensors may be used directly for this purpose. Alternatively, it is also possible to determine the rotor temperature using further measured values, such as currents or voltages.

According to one embodiment, the control unit is designed to adapt a switching frequency of the control signals for controlling the voltage converter using the temperature in the rotor. By adapting the switching frequency for controlling the semiconductor switching elements in a voltage converter in such a manner, it is possible to operate the electrical machine in the most efficient operating mode possible while avoiding an excessive increase in the rotor temperature.

According to one embodiment, the control unit is designed to increase a switching frequency of the control signals for controlling the voltage converter if the temperature in the rotor of the electrical machine exceeds a specified limit value. Accordingly, the control unit may also allow lower switching frequencies for controlling the voltage converter if the temperature in the rotor of the electrical machine falls below a corresponding further limit value. In this way, too large a temperature increase in the rotor of the electrical machine can be avoided on the one hand while achieving as efficient an operation of the electrical machine as possible since the switching losses in the voltage converter also decrease with decreasing switching frequency, for example.

According to one embodiment, the control unit is designed to set the switching frequency of the control signals for controlling the voltage converter within a predetermined control range. The control unit may be designed to adapt the predetermined control range using the temperature in the rotor of the electrical machine. In particular, the control unit may, for example, define the minimum, and, if necessary, also the maximum, permissible switching frequency based on the current temperature in the rotor of the electrical machine. The operation of the electric drive system can then be set and optimized within this control range according to further framework conditions.

According to one embodiment, the control unit is designed to switch between a plurality of specified modulation methods depending on the determined temperature in the rotor of the electrical machine. As already mentioned above, the modulation methods may comprise not only a space vector pulse width modulation but also further modulation methods, such as a control according to the so-called flat-top method or a control in fundamental frequency clocking. Of course, any further modulation methods are also possible. In addition, so-called overmodulation for suitable modulation methods may also be adapted on the basis of the current temperature in the rotor of the electrical machine.

According to one embodiment, the control unit is designed to adapt a degree of overmodulation for controlling the voltage converter using the determined temperature in the rotor of the electrical machine. In particular, the overmodulation may be lowered as the rotor temperature increases. For example, overmodulation may be completely prevented if a predetermined temperature in the rotor of the electrical machine is exceeded. On the other hand, overmodulation may be allowed if the temperature in the rotor of the electrical machine falls below a corresponding limit value. By overmodulation, a higher overall efficiency can, for example, be achieved, but the rotor of the electrical machine is possibly more thermally loaded as a result of the overmodulation.

According to one embodiment, the control unit is designed to adapt the modulation method using at least one further parameter. For example, for the selection of the modulation method and/or the switching frequency used, a maximum permissible voltage ripple at the input of the voltage converter, a desired noise development of the electric drive system, or any other operating parameter may additionally be considered.

The described embodiments and developments may be combined with one another as desired, where appropriate. Further embodiments, developments, and implementations of the invention also include combinations not explicitly mentioned of features of the invention described above or below with respect to the exemplary embodiments. In particular, a person skilled in the art will also add individual aspects as improvements or additions to the respective basic form of the present invention.

BRIEF DESCRIPTION OF THE DRAWINGS

The present invention is explained in more detail below with reference to the exemplary embodiments indicated in schematic figures of the drawings. Shown are.

DETAILED DESCRIPTION

Figure 1:
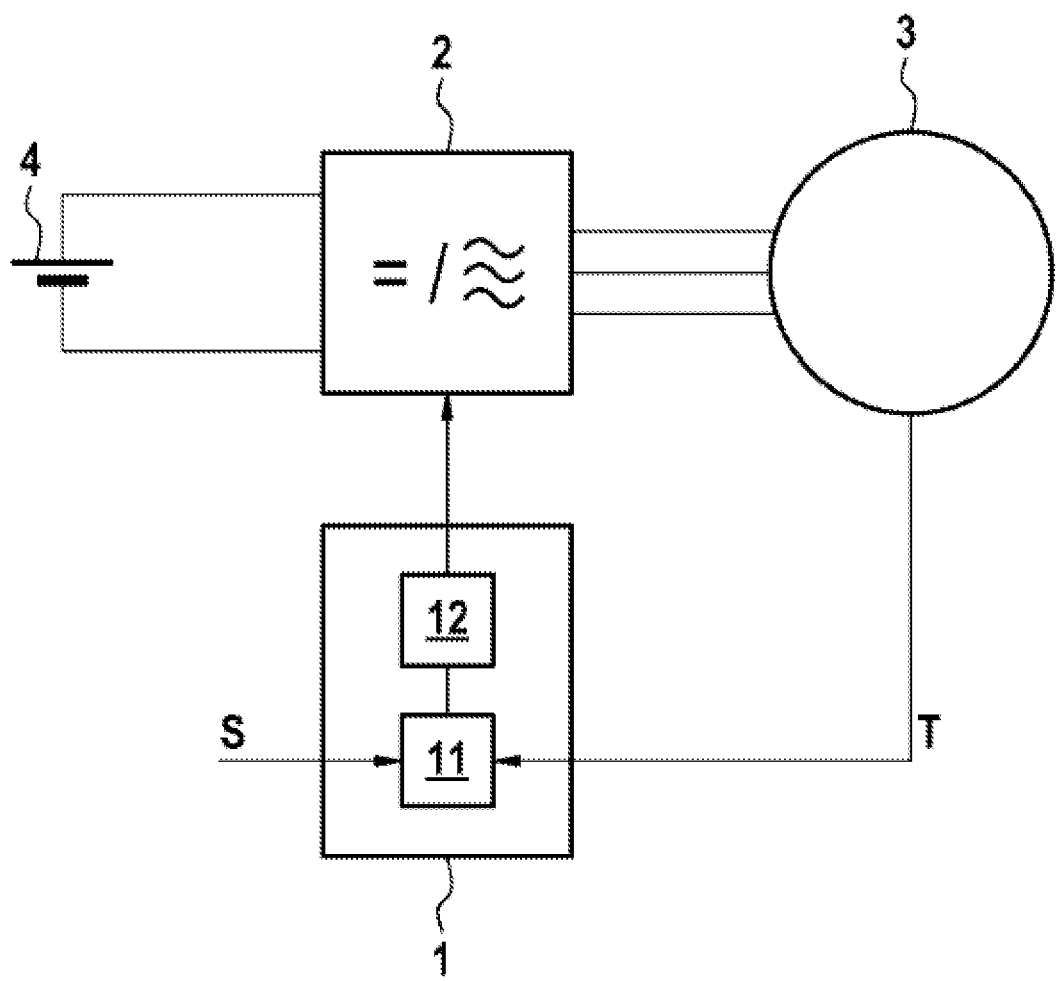
FIG. 1: a schematic representation of a block diagram of an electric drive system comprising a control device according to one embodiment.

FIG. 1 shows a schematic representation of a block diagram of an electric drive system according to one embodiment. The electric drive system comprises an electrical machine 3. The electrical machine 3 can be supplied by a power converter, in particular a single-phase or multiphase inverter 2. The power converter 2 is supplied on the input side by an electric energy source 4, in particular by an electric energy store, such as the traction battery of an electric vehicle. The power converter 2 converts the electrical energy provided by the electric energy source 4 into an electrical voltage suitable for setting a desired operating state, e.g., a desired rotational frequency or a desired torque, at the electrical machine 3. For this purpose, the power converter 2 may comprise a plurality of switching elements, in particular semiconductor switching elements, such as bipolar transistors comprising an isolated gate connection (IGBT) or silicon carbide transistors or the like. The switching elements of the power converter 2 may be opened and closed by means of suitable control signals. For this purpose, the individual switching elements of the power converter 2 may be controlled by means of corresponding control signals. These control signals may be provided by the control device 1, for example. In particular, the control signals may be generated at a predetermined clock frequency. In particular, the semiconductor switching elements may be controlled by pulse width modulation (PWM). The specifications for setting a particular operating state, such as rotational frequency or torque, may be provided, for example, by means of corresponding setpoint specifications S at the control device 1.

One or more half bridges (not shown here) may, for example, be provided in the voltage converter 2. In particular, a half bridge may be provided for each electrical phase on the output side of the voltage converter 2. Each half bridge may comprise, for example, two semiconductor switching elements.

The individual semiconductor switching elements may be controlled, i.e., opened and closed, according to a specified switching scheme. For this purpose, a suitable control signal may in each case be provided at the control connections of the semiconductor switches. For example, these control signals may be provided by the device 1 for controlling the voltage converter 2.

Typically, the individual switching elements of the voltage converter 2 are opened and closed periodically. Either angular synchronous or time synchronous clocking may be used for this purpose. In the case of an angular synchronous clocking, the period duration can be adapted according to the phase velocity or the rotational frequency of a connected electrical machine 3. In the case of a time synchronous clocking, on the other hand, the period duration is independent of the phase velocity or rotational frequency of the electrical machine 3. Generally, in each period of the respective time grid, opening and closing of the respective switching element of the voltage converter 2 take place. The effective voltage level at the output of the voltage converter 2 can be set by varying the duty cycle. Such a variation of the duty cycle is also known under the term "pulse width modulation" (PWM).

The device 1 for controlling the voltage converter 2 can control the switching elements of the voltage converter 2 according to a suitable duty cycle on the basis of a specified setpoint S. If necessary, even further parameters, for example a measured value of the current output voltage or the like, may be considered for the calculation of a suitable duty cycle.

The device 1 for controlling the voltage converter 2 comprises a monitoring unit 11, which inter alia determines the temperature in the rotor of the electrical machine 3. For this purpose, the monitoring unit 11 may, for example, receive sensor values from suitable temperature sensors, said sensor values providing direct or indirect information on the temperature in the rotor of the electrical machine 3. Additionally or alternatively, it is also possible to estimate or calculate the temperature in the rotor of the electrical machine 3. For this purpose, the temperature development in the rotor may be simulated or calculated on the basis of a mathematical model, for example. For this calculation, setpoint specifications for controlling the electric drive system and/or further measured values, such as electric currents or voltages, may be included, for example.

The temperature of the rotor of the electrical machine 3 determined by the monitoring unit 11 may be used to control the generation of the control signals for the voltage converter 2. If necessary, further suitable parameters may additionally also be considered. For example, the control unit 12, which generates the control signals for controlling the voltage converter 2, can set the switching frequency or the clock rate for controlling the individual switching elements in the voltage converter 2 using the rotor temperature. For example, the control unit 12 may, for this purpose, increase the switching frequency for controlling the switching elements in the voltage converter 2 if the temperature of the rotor in the electrical machine 3 increases or exceeds a specified threshold value. Accordingly, if the rotor temperature decreases, for example to below a further threshold value, the switching frequency can be reduced accordingly. Increasing or decreasing the switching frequency may occur in stages, i.e., in discrete steps. Alternatively, a more or less continuous increase or decrease of the switching frequency depending on the rotor temperature is possible.

Controlling the switching elements in the voltage converter 2 can take place on the basis of different control or modulation methods. One such modulation method is, for example, known under the term "Space Vector Pulse Width Modulation" (SVPWM). In addition, there are other control or modulation methods, e.g., the so-called flat-top method or so-called fundamental frequency clocking. Of course, any other suitable methods for controlling the voltage converter 2 are, in principle, also possible. Since these different control and modulation methods also have different properties with respect to the temperature development in the rotor of the electrical machine and also influence further components of the electric drive system, the rotor temperature can also be influenced by a suitable selection of the modulation method. Accordingly, the control unit 12 may select and apply the respective modulation method depending on the determined rotor temperature. For example, at low rotor temperatures, the flat-top method or fundamental frequency clocking may preferably be used. These methods generally result in lower electrical losses in the voltage converter 2. However, they may lead to a higher thermal load in the rotor of the electrical machine. Accordingly, at higher rotor temperatures, for example when a specified limit temperature is exceeded, a switch can be made to another modulation method, e.g., SVPWM. This possibly produces higher switching losses in the voltage converter 2 but a lower thermal load in the rotor of the electrical machine.

In addition, overmodulation may also be used to influence the various properties, such as effectiveness and temperature development in the rotor. For example, overmodulation generally results in higher efficiency but also higher thermal loads in the rotor of the electrical machine 3. Accordingly, if the rotor temperature is exceeded, overmodulation can be prevented via a limit value, while the control with overmodulation can take place below a limit value.

In addition to considering the rotor temperature, the setting of the modulation method may also be set on the basis of one or more further parameters. For example, requirements with respect to a voltage ripple occurring at the input of the voltage converter 2 due to the operation of the voltage converter 2 may also influence the selection of the modulation method and/or the switching frequency. In addition, a desired noise development of the drive system may, for example, also influence the switching frequency and/or modulation method. Accordingly, for the selection of the respective control or modulation method as well as the switching frequency used, the control unit 12 may consider not only the rotor temperature but also these further parameters. The control may, for example, take place on the basis of characteristic curves determined in advance and stored in the control device 1. For example, on the basis of the rotor temperature, the control unit 12 may first specify a control range for the switching frequency, and the control unit 12 may then set the current switching frequency within this control range.

Figure 2:
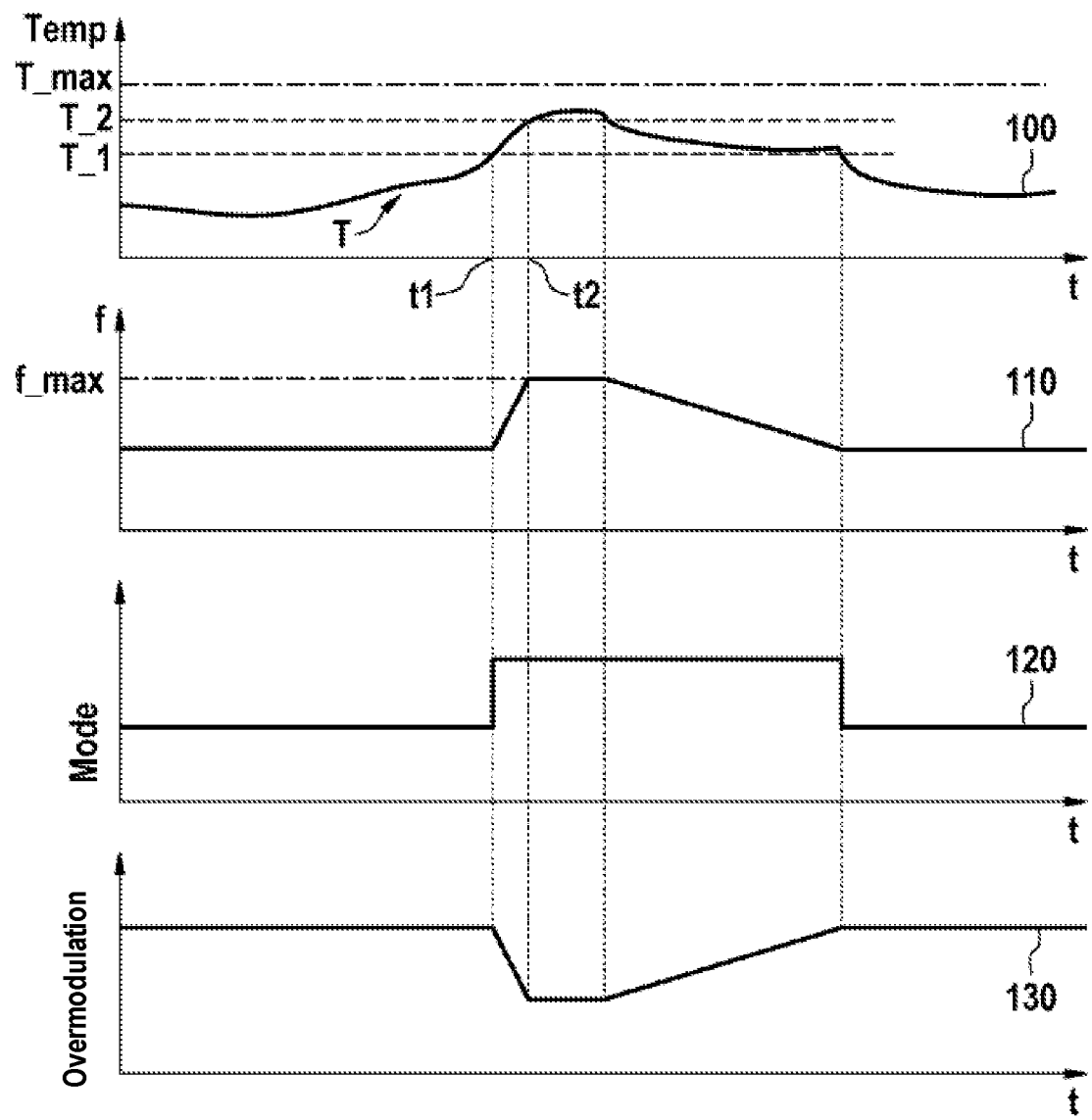
FIG. 2: a schematic representation for setting operating parameters depending on the rotor temperature, according to one embodiment.

FIG. 2 shows a schematic diagram for setting operating parameters depending on a temperature in the rotor of an electrical machine 3, according to one embodiment. The upper diagram shows the temperature profile 100 in the rotor of the electrical machine 3. The diagram below it shows a possible profile 110 of the switching frequency. In the third diagram, a possible switch between various modulation or control methods is shown as curve profile 120. The last diagram shows a possible profile 130 of an overmodulation for controlling the voltage converter 2.

As can be seen in these diagrams, the rotor temperature exceeds a first limit value T_1 at time t1. Various measures are possible when this limit value is exceeded. For example, the switching frequency for controlling the switching elements in the voltage converter 2 may be increased. Additionally or alternatively, the modulation or control method may be changed, for example. Furthermore, it is also possible to reduce the overmodulation of the modulation method used. The individual measures may be carried out either together, individually, or in any combination. Measures, such as the variation of the switching frequency or the adaptation of the overmodulation can take place either continuously depending on the temperature increase in the rotor, in stages, or in binary form (switching between two fixedly specified values). At time t2, the rotor temperature reaches a second limit value T_2. When this second limit value is reached, the switching frequency may be set to the maximum switching frequency within the control range, for example. Furthermore, overmodulation may be dispensed with entirely. These settings may, for example, be maintained until a corresponding limit value of the rotor temperature is again fallen below. Subsequently, the corresponding settings may be adapted continuously or in steps for higher efficiency (associated with a possibly higher thermal load on the rotor) until a lower limit temperature T_1 is reached.

In this way, the electric drive system can be operated with the highest possible efficiency and, if necessary, according to further desired framework conditions, as long as the rotor temperature permits such operation. In addition, by adapting the appropriate operating parameters, in particular the selection of the modulation method as well as the switching frequency in the respective modulation method, the operation of the electric drive system can be adapted in such a way that the thermal load in the rotor of the electrical machine 3 does not exceed a permissible level.

Figure 3:
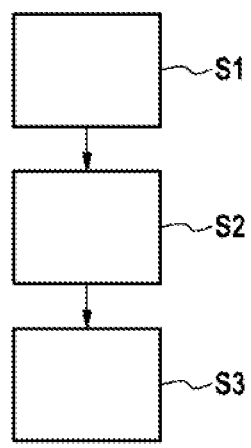
FIG. 3: a flowchart as underlying a method for controlling an electric drive system according to one embodiment.

FIG. 3 shows a schematic representation of a flowchart, as underlying a method for controlling an electric drive system according to one embodiment. The method may in principle comprise any steps as already described above in connection with the electric drive system. Accordingly, the electric drive system, in particular the control device 1, may also comprise any components required for implementing the method described below.

In step S1, a voltage converter 2 of the electric drive system is operated with a predetermined modulation method. In step S2, a temperature of the rotor of the electrical machine 3 of the electric drive system is determined. Then, in step S3, the modulation method may be adapted to operate the drive system. In particular, the adaptation of the modulation method may be adapted using the determined temperature of the rotor of the electrical machine.

In summary, the present invention relates to controlling an electric drive system. According to the invention, the rotor temperature of an electrical machine is monitored and modulation methods and the switching frequency for controlling the drive system are adapted depending on the rotor temperature.

The invention claimed is:

1. A control device (1) for an electric drive system having a voltage converter (2) and an electrical machine (3), the control device (1) comprising:
   a monitoring unit (11) configured to determine a temperature in a rotor of the electrical machine (3); and
   a control unit (12) configured to generate control signals for controlling the voltage converter (2) according to a predetermined modulation method and to supply them to the voltage converter (2),
   wherein the control unit (12) is configured to adapt the modulation method using the determined temperature in the rotor and a voltage ripple occurring at the input of the voltage converter (2), and wherein the control unit (12) is configured to increase a switching frequency of the control signals for controlling the voltage converter (2) if the temperature in the rotor of the electrical machine (3) exceeds a specified limit value.

2. The control device (1) according to claim 1, wherein the monitoring unit is configured to determine the temperature in the rotor of the electrical machine (3).

3. The control device (1) according to claim 1, wherein the control unit (12) is configured to adapt the switching frequency of the control signals for controlling the voltage converter (2) using the temperature in the rotor.

4. The control device (1) according to claim 1, wherein control unit (12) is configured to adapt the switching frequency of the control signals for controlling the voltage converter (2) within a predetermined control range, and wherein the control unit (12) is configured to adapt the predetermined control range using the temperature in the rotor of the electrical machine (3).

5. The control device (1) according to claim 1, wherein the control unit (12) is configured to switch between a plurality of specified modulation methods depending on the determined temperature in the rotor of the electrical machine (3).

6. The control device (1) according to claim 1, wherein the control unit (12) is configured to adapt a degree of overmodulation for controlling the voltage converter (2) using the determined temperature in the rotor of the electrical machine (3).

7. The control device (1) according to claim 1, wherein the control unit is configured to adapt the modulation method using at least one further parameter.

8. An electric drive system comprising:
    an electrical machine (3);
    a voltage converter (2) configured to control the electrical machine (3); and
    a control device (1) having
        a monitoring unit (11) configured to determine a temperature in a rotor of the electrical machine (3); and
        a control unit (12) configured to generate control signals for controlling the voltage converter (2) according to a predetermined modulation method and to supply them to the voltage converter (2),
        wherein the control unit (12) is configured to adapt the modulation method using the determined temperature in the rotor and a voltage ripple occurring at the input of the voltage converter (2), and
        wherein the control unit (12) is configured to increase a switching frequency of the control signals for controlling the voltage converter (2) if the temperature in the rotor of the electrical machine (3) exceeds a specified limit value.

9. A method for controlling an electric drive system comprising a voltage converter (2) and an electrical machine (3), the method comprising the steps of:
    operating (S1) the voltage converter (2) with a predetermined modulation method;
    determining (S2) a temperature in a rotor of the electrical machine (3); and
    adapting (S3) the modulation method using the determined temperature in the rotor of the electrical machine (3) and a voltage ripple occurring at the input of the voltage converter (2); and
    increasing a switching frequency of control signals for controlling the voltage converter (2) if the temperature in the rotor of the electrical machine (3) exceeds a specified limit value.

* * * * *